United States Patent [19]
Estep et al.

[11] Patent Number: 5,203,422
[45] Date of Patent: Apr. 20, 1993

[54] ONE-WAY TRAFFIC MONITOR

[76] Inventors: William E. Estep, P.O. Box 314, Powellton, W. Va. 25161; Robert J. Stephens, P.O. Box 36, Charlton Heights, W. Va. 25040

[21] Appl. No.: 904,458

[22] Filed: Jun. 26, 1992

[51] Int. Cl.⁵ .............................................. B60T 7/12
[52] U.S. Cl. .................................... 180/169; 340/935
[58] Field of Search ............... 180/167, 169, 279, 283; 318/587; 340/935; 342/61

[56] References Cited

U.S. PATENT DOCUMENTS

| | | | |
|---|---|---|---|
| 2,896,089 | 7/1959 | Wesch | 180/169 |
| 3,112,004 | 11/1963 | Neaville | 180/169 |
| 3,559,756 | 2/1971 | Torres | 180/169 |
| 3,898,652 | 8/1975 | Rashid | 180/169 X |
| 4,073,359 | 2/1978 | Fujiki et al. | 180/169 |
| 4,407,388 | 10/1983 | Steel | 180/169 X |
| 4,566,032 | 1/1986 | Hirooka et al. | 180/169 X |

*Primary Examiner*—Margaret A. Focarino
*Assistant Examiner*—Michael Mar
*Attorney, Agent, or Firm*—Richard C. Litman

[57] ABSTRACT

A monitor system detects and disables a vehicle driving the wrong way on a one-way road or traffic lane. An alarm warns the driver of the unsafe condition and operation of the vehicle four-way flasher warns other motorists. The system includes a light transmitter and receiver, and controls to disable the vehicle and operate the alarm and four-way flasher. Light is transmitted forward, where it may strike a reflector mounted on a post or other structure associated with the road or lane being monitored. Upon detecting reflected light, the system operates. The system is reset after operation by using the ignition switch to start the engine. Selection of reverse gear overrides the system, permitting a vehicle to back away from a directionally restricted road or traffic lane.

3 Claims, 2 Drawing Sheets

ONE-WAY TRAFFIC MONITOR

BACKGROUND OF THE INVENTION

1. Field of the Invention

The present invention relates to a monitor system for detecting and stopping vehicles traveling the wrong way on a portion of a road designated for a particular direction. The monitor system more particularly includes transmitter, receiver and control means within the vehicle and includes one or more reflectors mounted on or near the road structure.

2. Description of the Prior Art

Collisions involving motor vehicles have catastrophic consequences, and automatic systems for reducing speed or otherwise controlling a vehicle have long been known. These systems typically rely upon a system of reflected energy being received by a vehicle that is speeding, or excessively close to another vehicle or to an oncoming vehicle, the reception thereof activating controls.

The problem of a motor vehicle being driven the wrong way on a one-way lane or road is infrequently encountered, but the consequences are sufficiently severe that automatic intervention is warranted. In U.S. Pat. No. 3,559,756, issued on Feb. 2, 1971 to Noel M. Torres, a detection system is presented that applies the brakes of a vehicle detected going the wrong way. Torres provides a transmitter, receiver and controlling apparatus aboard a vehicle, and appropriate reflectors built into the road structure. The controlling apparatus includes a pulse counter. The rate of reflected energy is used to make control decisions, such as possible adjustment of the throttle, and to control the degree of corrective adjustment made.

There are a number of practical aspects which are not addressed by Torres that render control of the vehicle tenuous. The lack of an alarm indicator may render the driver confused, the driver then possibly responding inappropriately. One example is that if the driver fails to recognize the problem, he or she may attempt to increase speed, overriding the throttle adjustment and pitting the engine against the brakes. Since this will typically occur on a curved ramp, loss of vehicle control may result.

A second example is the predetermined safe minimum distance to the reflector that triggers brake actuation. Torres refers to such a distance, but no procedure for determining the actual value of such a distance is presented. This distance may vary with the weather, traffic density and other conditions to which the detection system may not respond or adjust. Torres further assumes that the apparatus will incorporate a minimum signal threshold to preclude frequent false responses. Setting such a minimum value, and adjusting it for different conditions, may prove difficult to accomplish in practice.

Similarly, brake override of the speed control is subject to calibration problems. This could be true due to varying radius of road curvature of different ramps or variations in ascending or descending grades, different speeds being safe on different ramps. A vehicle being calibrated to a single value is susceptible to being inappropriately calibrated for any given ramp.

U.S. Pat. No. 3,112,004, issued to Arthur W. Neaville on Nov. 26, 1963, discloses a vehicle disablement system which shuts down the vehicle engine, restart being enabled after a predetermined time delay.

U.S. Pat. No. 2,896,089, issued to Ludwig Wesch on Jul. 21, 1959, discloses a vehicle warning system which detects proximity of an obstacle, and which provides a visible or audible alarm to the vehicle operator.

None of the above inventions and patents, taken either singly or in combination, is seen to describe the instant invention as claimed.

SUMMARY OF THE INVENTION

The present invention detects vehicles traveling the wrong direction on a one-way road or traffic lane and automatically warns the driver and takes measures to arrest the vehicle's progress. The detection apparatus includes an energy transmitter, an energy receiver, and a control unit, all located aboard the vehicle, and includes at least one reflector mounted externally to the vehicle. A preferred mounting would be on a post or similar permanent structure associated with the road or lane being monitored. The energy is preferably light, and the reflector is preferably retroreflective.

When light is transmitted and strikes a reflector positioned to detect an oncoming vehicle, that light is reflected back to a receiver located proximate the transmitter. In a preferred embodiment, reflected light is encoded, as by partial reflection incorporating a bar code type pattern, to defeat spurious signals. The control unit then disables the vehicle engine for a predetermined time period, activates an alarm for the same predetermined time period. The alarm is visible, audible or both, and is located within the vehicle to advise the operator. Otherwise, the operator might not realize why the vehicle is disabled. Optionally, a vehicle four-way flasher is activated until the system is reset.

Resetting the system after being shut down due to wrong direction driving is performed by restarting the engine in conventional manner. Selection of reverse gear by a gearshift apparatus overrides the traffic monitor. A vehicle is thus enabled to be backed down a ramp without repeatedly initiating shutdown by the traffic monitor.

Accordingly, it is a principal object of the invention to provide a one-way traffic monitor which detects a vehicle driving the wrong way on a one-way road or traffic lane.

An additional object of the invention to provide a one-way traffic monitor utilizing reflected energy to detect a vehicle driving the wrong way.

It is another object of the invention to provide a one-way traffic monitor with all apparatus being carried on board the vehicle except a reflector.

Yet another object of the invention is to provide a one-way traffic monitor utilizing reflected light, the reflector being retroreflective.

A further object of the invention is to provide a one-way traffic monitor responsive only to intended signals.

It is a further object of the invention to provide a one-way traffic monitor which disables a vehicle upon detection of wrong direction driving.

It is more particularly an object of the invention to shut off the engine of a vehicle being disabled upon detection of wrong direction driving.

Still another object of the invention is to provide an alarm on board a vehicle being disabled upon detection of wrong direction driving.

It is still a further object of the invention to provide external indication of an alarm condition of a vehicle upon detection of wrong direction driving.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides a one-way traffic monitor 10 for detecting a vehicle V being driven the wrong way on a one-way road or traffic lane R. The monitor 10 includes apparatus to arrest progress of the vehicle V and to warn the driver of the unsafe condition.

Figure 1A:
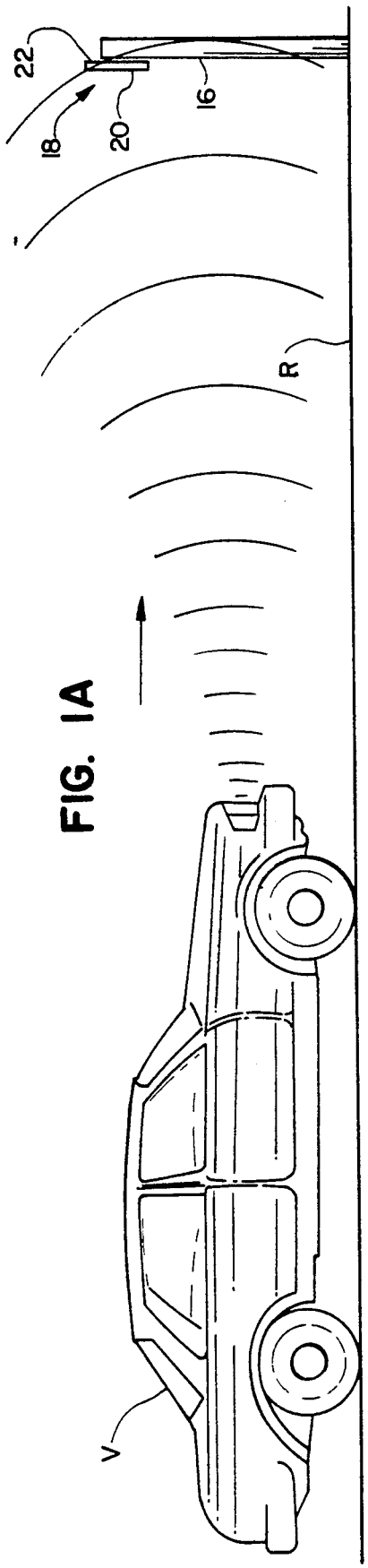
FIGS. 1A and 1B are side elevational views of a vehicle approaching a reflector.
Figure 1B:
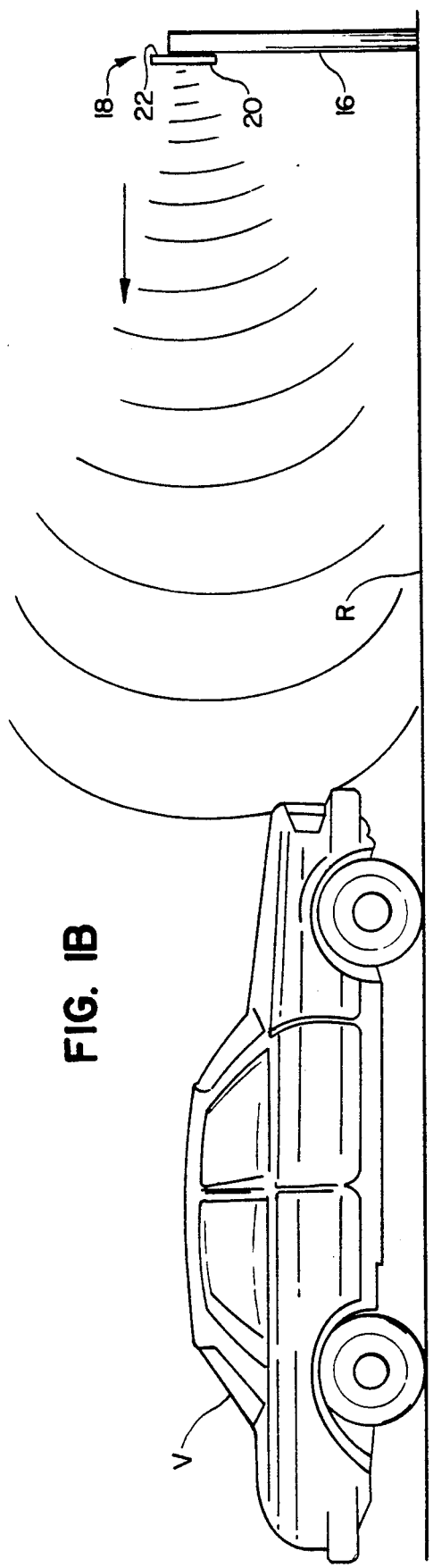
Figure 2:
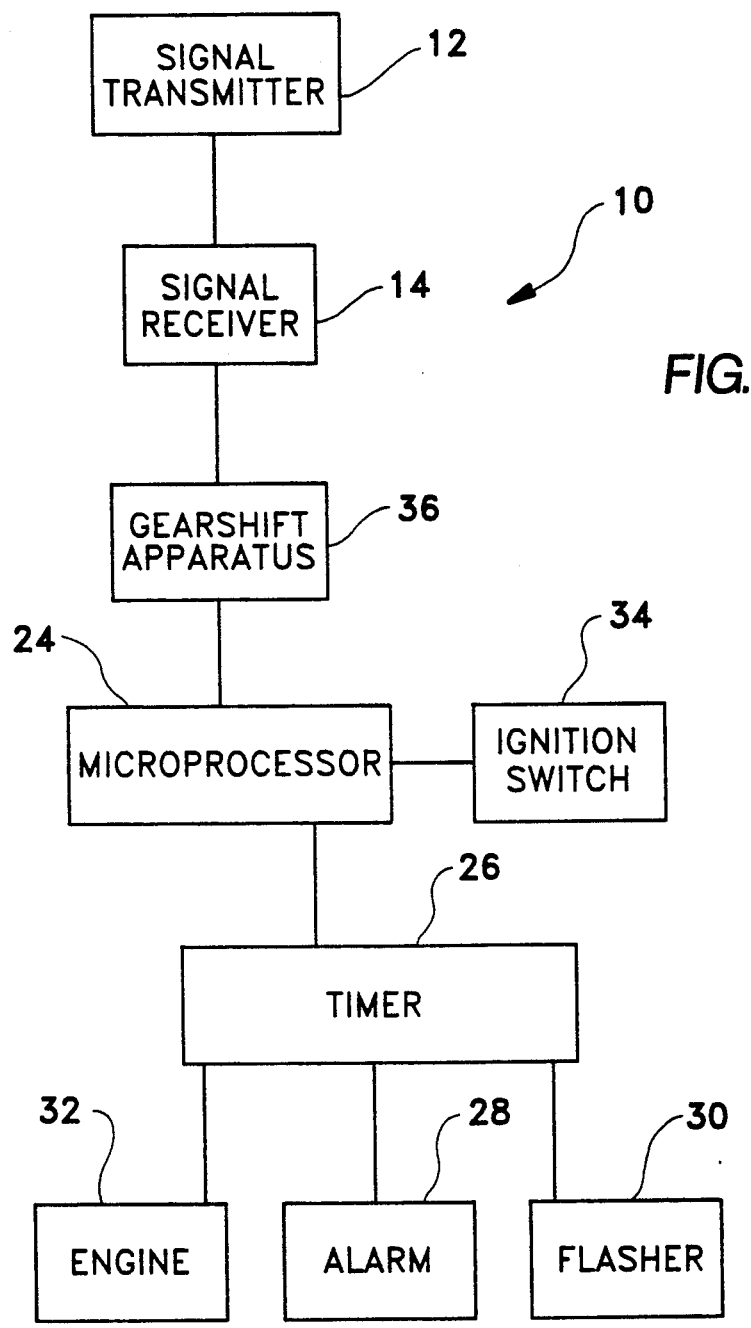
FIG. 2 is a schematic representation of the vehicle carried components of the invention.
Figure 3:
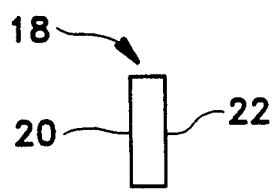
FIG. 3 is a side elevational view of a reflector.

Mounted aboard the vehicle V are an infrared transmitter 12 and receiver 14, and all monitor components except a reflector 16. The reflector 16 is mounted on a post 18 or to similar permanent structure associated with a road or traffic lane R being monitored for driving in a direction opposite the intended direction is a reflector 16, preferably retroreflective. The reflector 16 is shown in FIGS. 1A and 1B, arrows indicating the direction of light transmission (FIG. 1A) and reflection (FIG. 1B). The reflector 16 is aimed to reflect light back toward a vehicle V traveling the wrong direction.

The reflector 16 has a retroreflective operative face 20 and a non-reflective inoperative reverse 22, or, alternatively, the inoperative reverse 22 is pointed away from oncoming traffic. On curves, a reflector reverse 22 will ordinarily point away from the traffic lane R. On a straight road R, the reflector reverse 22 is preferably not parallel to the operative face 20. Vehicles traveling in the intended or designated direction are thus not subject to reflection of their own transmitted light.

Figure 4:
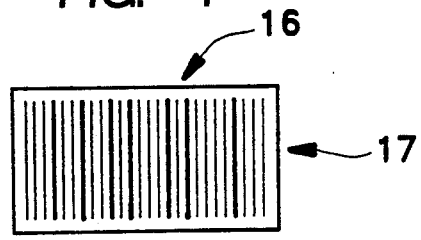
FIG. 4 is a front elevational view of a reflector.

In a preferred embodiment, the reflector 16 has bar code type encoding 17 recognizable to the one way traffic monitor 10 disposed upon the operative face 20. This encoding 17, seen in FIG. 4, enables a microprocessor 24 to screen out spurious signals that might otherwise cause the one way traffic monitor 10 to deploy in unintended situations.

If the receiver 14, which is responsive to the type of light transmitted, detects reflected transmitted light, a control unit comprising the microprocessor 24 activates. The microprocessor 24 then sends a signal controlled by a timer 26, the signal disabling the vehicle V, operating an alarm 28 and operating the vehicle four-way flasher 30. The alarm 28 is audible, visible or both, and is located within the vehicle V so as to be discernible to the driver.

Disabling of the vehicle V preferably comprises opening an electrical circuit (not shown) which is necessary for operation of the engine 32. An example of such a circuit is power supplied to the vehicle ignition system (not shown). It is felt that a stalled engine is a more frequently encountered occurrence than the system of Torres in '756. This is especially important in a situation in which the driver must take quick action to correct an unsafe condition.

The timer 26 limits opening of the critical engine circuit for a predetermined time interval, typically five seconds. The alarm 28 is activated for the same time interval. At the end of this time interval, engine operability is restored by closing the critical engine circuit, and the alarm 28 abates. The four-way flasher 30 is operated until the monitor 10 is reset.

Resetting is performed by moving the ignition switch 34 to its off position, followed by restarting the engine 32. A signal derived from the ignition switch 34 being moved into the start position resets the microprocessor 24, the vehicle V thereby being drivable again. Manipulation of the vehicle gearshift apparatus 36 sends a signal which the microprocessor 24 uses to cause a temporary override of the monitor 10. The vehicle V may then be driven in reverse so as to exit the road or traffic lane R. The vehicle V is thus not subject to repeated shutdown upon light being reflected back to the receiver 14 in the course of correcting the dangerous condition. Once away from the one-way road or traffic lane R, the vehicle is normally drivable.

In a alternative embodiment, moving the ignition switch 34 to the off position resets the microprocessor 24.

It is to be understood that the present invention is not limited to the sole embodiment described above, but encompasses any and all embodiments within the scope of the following claims.

We claim:

1. A vehicle disablement system for detecting and stopping a vehicle traveling in an undesired direction, the vehicle having an engine, a gearshift apparatus movable to a reverse position, and an ignition switch selectively movable to an on and an off position, said disablement system comprising:

at least one reflector having encoding means, said reflector being mounted adjacent a road surface and being directed towards a vehicle traveling in an undesired direction, transmitting means for transmitting energy from said vehicle to said at least one reflector, receiving means for receiving energy reflected back to the vehicle from said at least one reflector, microprocessor means for recognizing said encoding means of said at least one reflector and for producing a recognition signal output in response thereto, disablement means for disabling the ignition system of the vehicle, timer means, activated in response to said recognition signal from said microprocessor, for activating said disablement means only after a predetermined interval of time has elapsed, reset means operably connected to said ignition switch for deactivating said disablement means in response to the ignition switch being moved to the off position and then to the start position, override means operably connected to the gearshift apparatus for preventing reactivation of said disablement means when the gearshift apparatus is shifted into a reverse gear position within said predetermined time interval, and alarm means activated in response to said recognition signal from said microprocessor.

2. The vehicle disablement system according to claim 1, wherein said energy transmitting means transmits infrared radiation.

3. The vehicle disablement system according to claim 1, wherein the vehicle has a four-way flasher activated in response to said recognition signal from said microprocessor.

* * * * *